Sept. 27, 1960 C. C. S. LE CLAIR 2,954,190
HOSE REEL AND CONTROL MECHANISM THEREFOR
Filed March 7, 1955 6 Sheets-Sheet 1
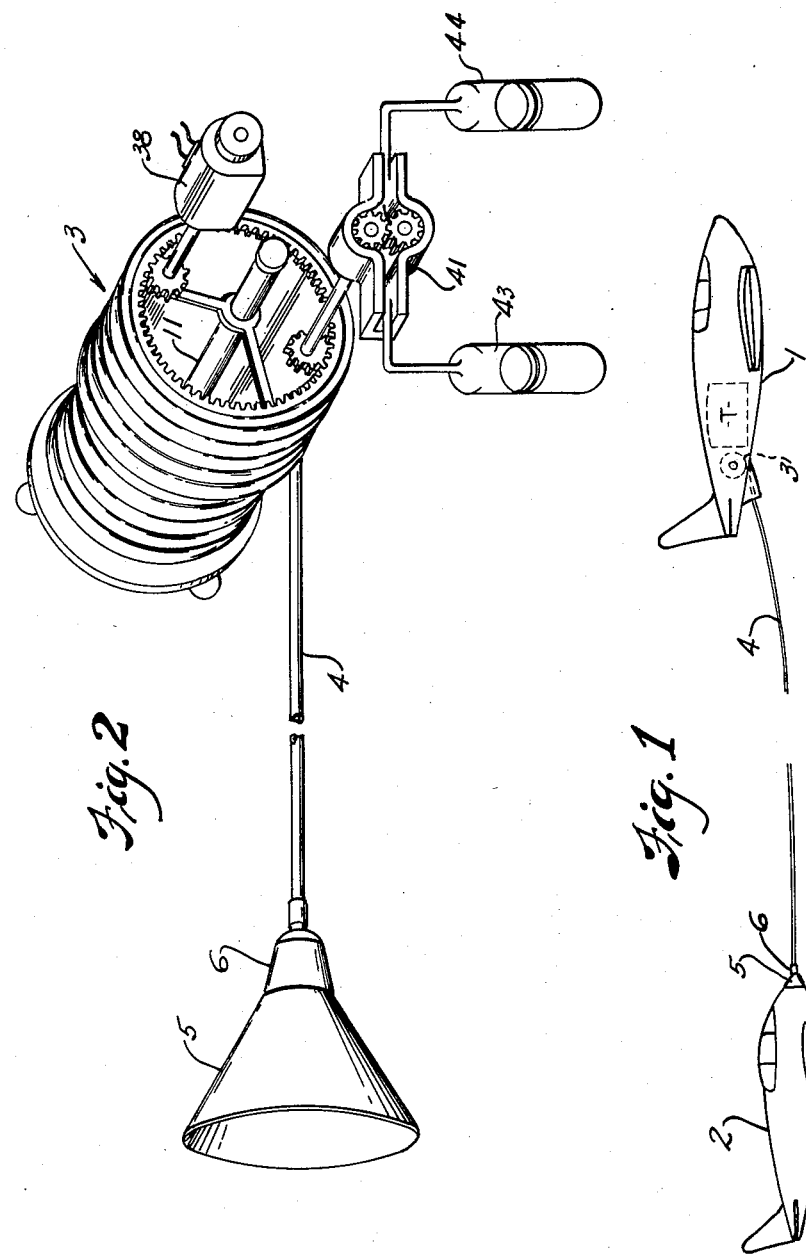
INVENTOR.
CAMILLE C. S. LeCLAIR
BY
Oberlin & Limbach
ATTORNEYS

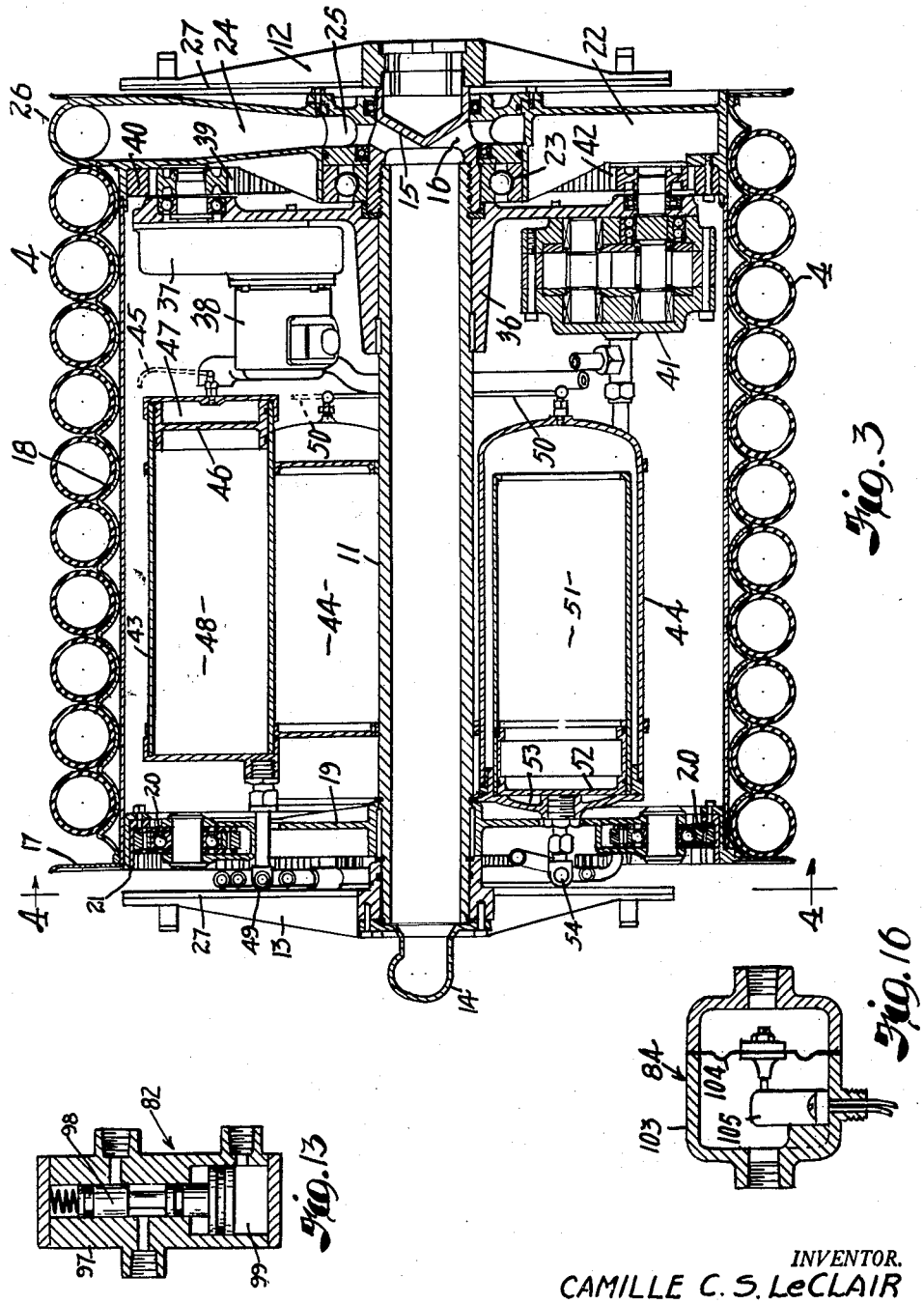

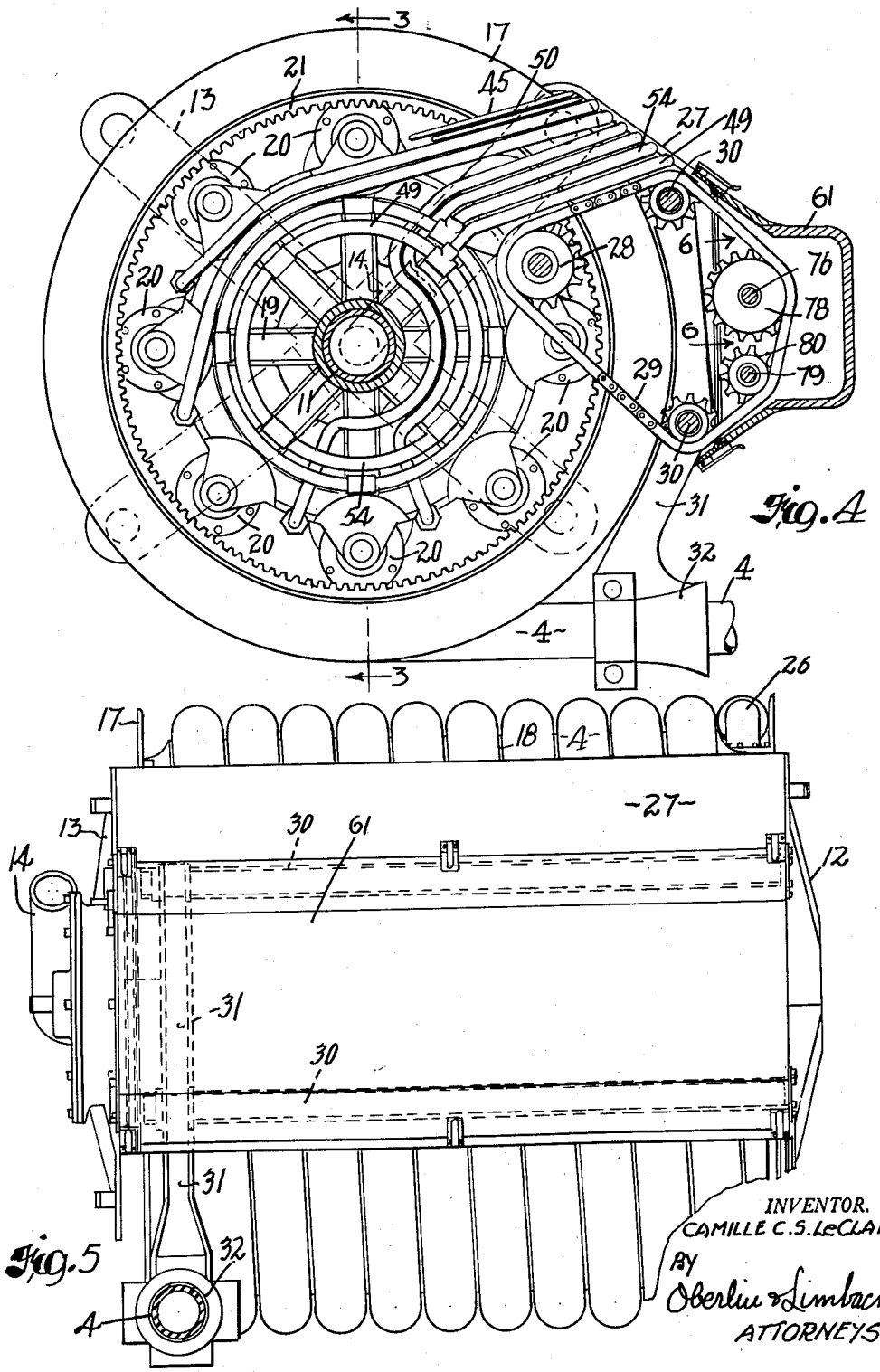

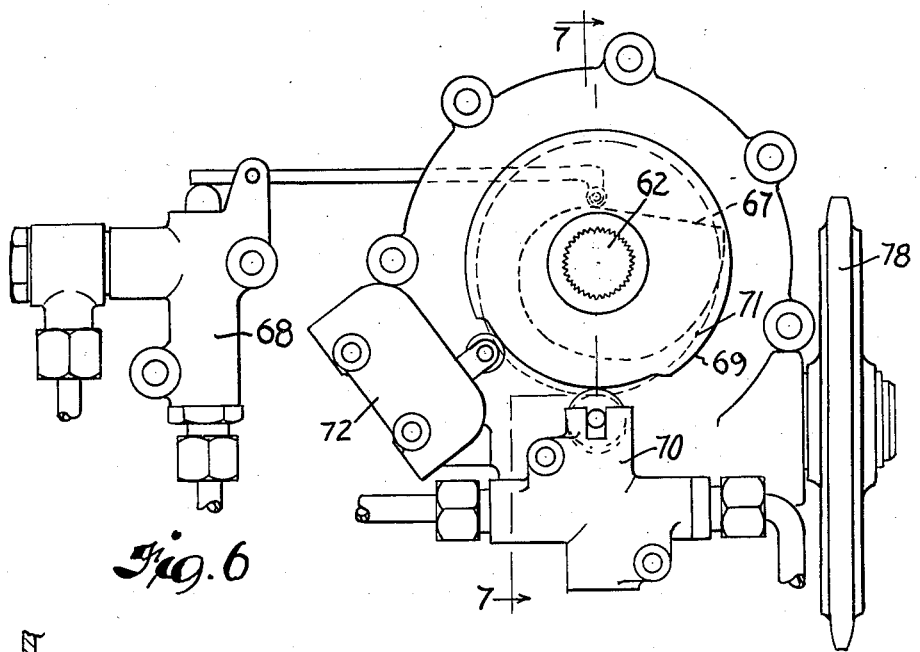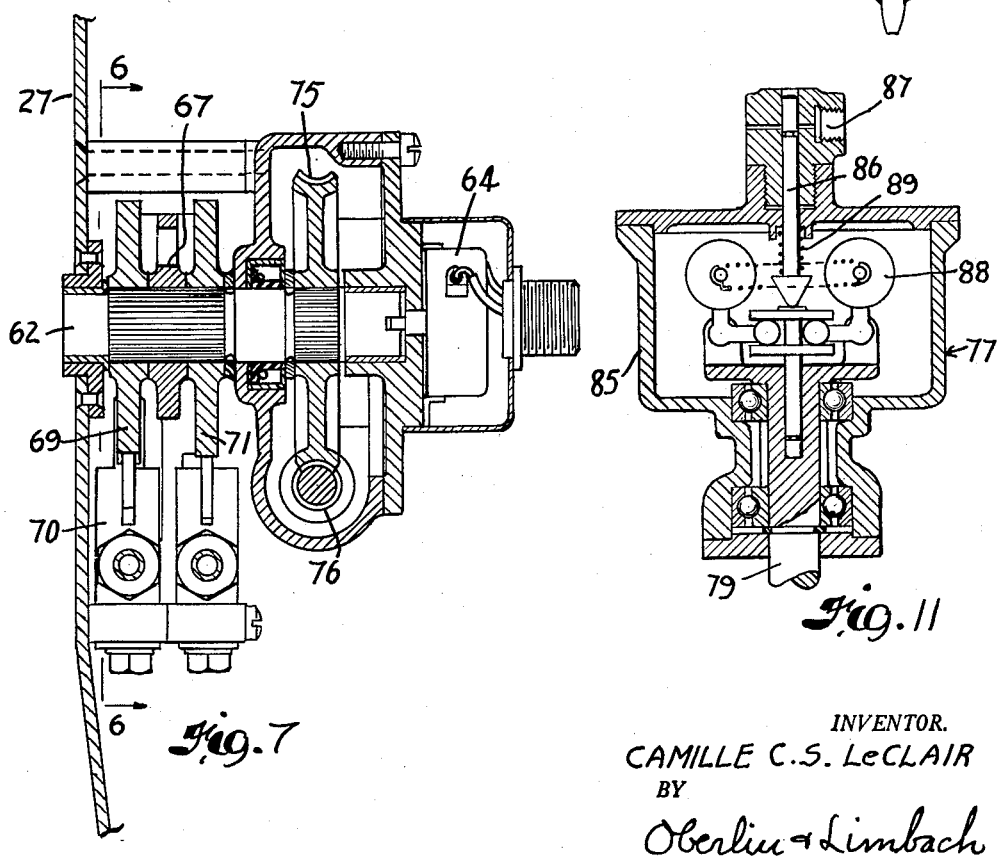

Sept. 27, 1960  C. C. S. LE CLAIR  2,954,190
HOSE REEL AND CONTROL MECHANISM THEREFOR
Filed March 7, 1955  6 Sheets-Sheet 5
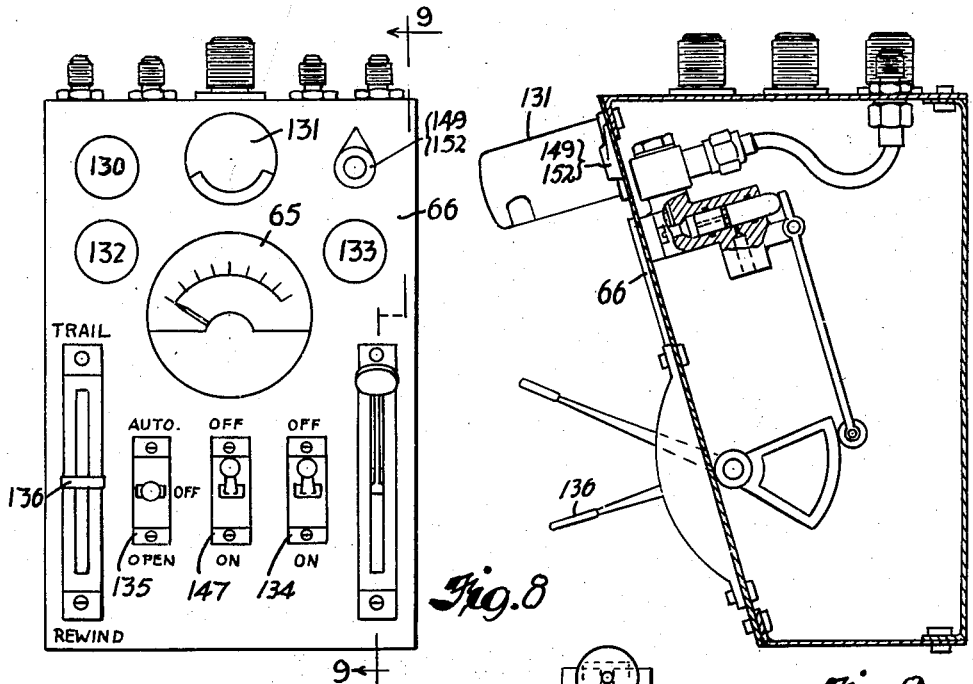
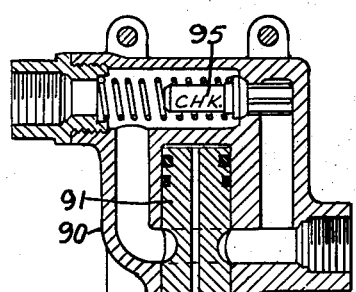
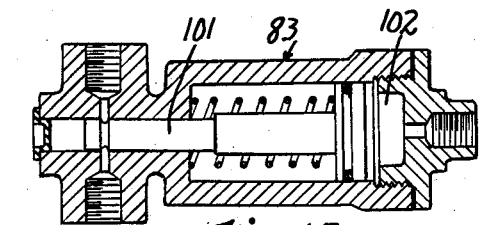
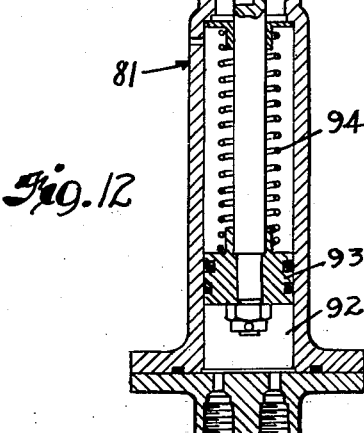
INVENTOR.
CAMILLE C. S. LeCLAIR
BY
Oberlin Limbach
ATTORNEYS.

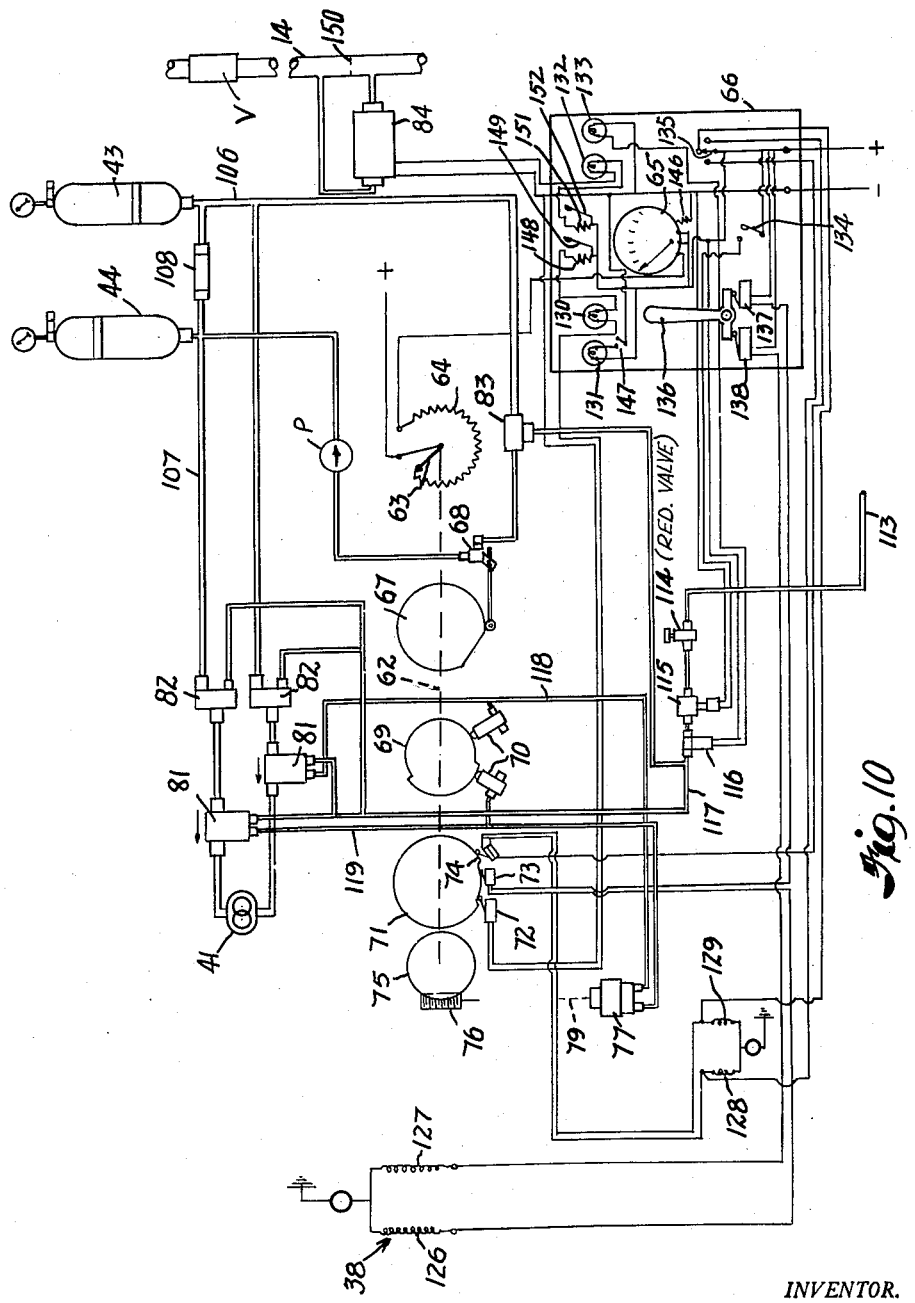

United States Patent Office 2,954,190
Patented Sept. 27, 1960

2,954,190

HOSE REEL AND CONTROL MECHANISM THEREFOR

Camille C. S. Le Clair, Toronto, Ontario, Canada, assignor to Parker-Hannifin Corporation, Cleveland, Ohio, a corporation of Ohio Filed Mar. 7, 1955, Ser. No. 492,356

14 Claims. (Cl. 244—135)

The present invention, while relating generally as indicated to a hose reel and control mechanism therefor, is more particularly concerned with a hose reel adapted for use in connection with the refueling of aircraft during flight.

Among the principal objects of this invention are the following, which are enumerated below without regard to the relative importance thereof:

(1) To provide a simplified form of hose reel and control mechanism therefor in which the hose tension is automatically controlled;

(2) To provide a hose reel and control mechanism having provision for automatic speed control for the unwinding and rewinding of the hose from the reel;

(3) To provide a hose reel and control mechanism which incorporates a hydraulic brake;

(4) To provide a hose reel which is of relatively large diameter and which has coiled therearound only a single layer of the hose, whereby pressure drop is reduced as compared with an equivalent length of hose coiled in multiple layers around a smaller drum or reel and whereby a more satisfactory low temperature operation is achieved because of the larger bend radius of the hose;

(5) To provide a hose serving arm which guides the hose as it is unwound from and rewound onto the reel, and which eliminates the necessity of mounting the reel proper for axial reciprocatory movement;

(6) To provide a control system for the hose reel which is operative to store energy during the unwinding of the hose from the reel for subsequent use in assisting in the rewinding of the hose onto the reel;

(7) To provide a hose reel which is power operated during the initial stage of the hose unwinding operation to lower the hose end and drogue thereon into the airstream and which thereafter is self-actuating under the influence of the frictional drag on the drogue to continue the unwinding operation at a speed and tension determined by the reel control mechanism; and (8) To provide a hose reel and associated fluid pressure circuit wherein the latter constitutes an energy reservoir effective during the hose unwinding operation to store energy for later release when it is desired to rewind the hose onto the reel therefor.

Aside from the foregoing objects of the present invention, it is also a primary object of this invention to provide an aircraft refueling-in-flight system wherein the trailing end of a fuel supply hose from the reel mechanism carried by the tanker airplane is detachably coupled to the receiver airplane which is being refueled and wherein the letting out of the hose from the tanker airplane activates not only a hose slack take-up mechanism so as to maintain, within limits, refueling communication between the tanker and receiver airplanes irrespective of variation in the relative distances therebetween, but, in addition, an energy storage system of the reel which is effective to assist in the reeling in of the hose upon decoupling of the trailing hose end from the receiver airplane.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of a few of the various ways in which the principle of the invention may be employed.

In said annexed drawings:

Fig. 1 is a side elevation view showing the refueling-in-flight operation according to the present invention, the hose reel and its control mechanism being mounted in the forward tanker airplane and the hose drogue being positioned over the nose of the trailing receiver airplane;

Fig. 2 is a somewhat diagrammatic perspective view of the present invention;

Fig. 3 is a vertical cross-section view diametrically through the hose reel constituting the present invention, such section having been taken substantially along the line 3—3, Fig. 4;

Fig. 4 is a transverse cross-section view, such section having been taken substantially along the line 4—4, Fig. 3;

Fig. 5 is an elevation view of the present invention as viewed from the righthand side of Fig. 4;

Fig. 6 is a view showing a cam mechanism and drive therefor, for controlling the sequence of operations of the hose reel, such view having been taken substantially along the line 6—6, Figs. 4 and 7;

Fig. 7 is a cross-section view taken substantially along the line 7—7, Fig. 6;

Fig. 8 is a front elevation view of the hose reel control box, which preferably is mounted for convenient operation at a place separate from the hose reel itself;

Fig. 9 is a cross-section view of the control box taken substantially along the line 9—9, Fig. 8;

Fig. 10 is a schematic piping and wiring diagram of the control mechanism for the hose reel; and Figs. 11 to 16 are cross-section views diagrammatically showing the overspeed governor valve, one of the brake control valves, one of the metering valves, one of the limiting valves, the air-operated pilot valve, and the differential pressure switch respectively which are shown in the aforesaid schematic diagram, Fig. 10.

Broadly stated, the present invention relates to a hose reel and control mechanism therefor in which the drogue-equipped hose is initially unwound by power drive means, and thereafter is unwound by frictional drag on the hose drogue, but under the control of tension and speed-governing means. During the refueling operation, said tension and speed-governing means are effective to control further unwinding or rewinding of the hose to maintain predetermined tension on the hose irrespective of whether the distance between the receiver and tanker airplanes is increasing or decreasing.

A further feature of the present invention is that the energy obtained from the airstream during hose unwinding operation is stored for subsequent use in assisting the power drive means in the rewinding of the hose onto the reel.

The construction and operation of the present invention will be found subdivided under the following headings herein:

I. Refueling in Fight Generally (Fig. 1);

II. The Hose Reel and Server Arm (Figs. 2–5);

III. Control Units and Control Circuits (Figs. 6–16); and

IV. Operation.

I. REFUELING IN FLIGHT GENERALLY (FIG. 1)

As is shown in Fig. 1, the tanker airplane 1 carrying a fuel load for refueling of the receiver airplane 2 has a hose reel assembly 3 therein, the hose 4 of which trails behind the tanker airplane 1 and has a drogue 5 fitting over the nose of the receiver airplane 2. Said receiver plane 2 will be provided with a probe nozzle assembly (not shown) which is latched to a complementary nozzle assembly 6 in the hose end to open the hose end and the fuel intake line of plane 2 for free flow of fuel through hose 4 into the fuel tank of said plane 2. The detail construction of suitable nozzle assemblies will be found disclosed in the copending application of Camille S. Le Clair, Serial No. 399,119, filed December 18, 1953.

As is evident, the hose reel assembly 3 must be able to accommodate relative altitude and speed variations of the planes 1 and 2, while yet prevent slack or undue tensioning of the fuel supply hose 4. This is, of course, of utmost importance and is admirably taken care of by the present invention as will be seen from the ensuing description.

II. THE HOSE REEL AND SERVER ARM (FIGS. 2-5)

a. *The hose reel*

Referring now more particularly to the hose reel assembly 3, the same comprises, as shown in Figs. 2 to 5, a fixed support tube 11 to the opposite ends of which mounting brackets 12 and 13 are secured, the latter, in turn, being suitably fastened in the tanker airplane 1.

The fuel supply line 14 from the fuel supply tank T of the airplane 1 is connected to one end of said support tube 11, and the other end of said tube has screwed thereonto an outlet coupling 15 formed with several radially outwardly directed discharge passages 16.

The hose reel 17 itself comprises a flanged drum around which a curved cross-section extruded or formed strip 18 is helically coiled to provide a helical groove for the convolutions of the hose 4 wound on said reel 17.

Adjacent the fuel inlet end of the support tube 11 is a support spider 19 having its hub keyed on said tube and carrying a series of circumferentially spaced anti-friction roller assemblies 20, the outer peripheries of which are fitted into a circular track of an internal ring gear 21 fixed in the adjacent end of the hose reel 17. Thus, this end of the reel 17 is supported for rotation about the axis of the support tube 11.

Similarly, the other end of said hose reel 17 is provided with a support disc or spider 22, there being an anti-friction bearing 23 between that end of the support tube 11 and the hub of said support disc. The latter is also provided with a radially extending passage 24 which, at its inner end, terminates at an annular space 25 in fluid communication with the aforesaid passages 16 of the coupling 15 and which, at its outer end, is in the form of an elbow 26 (see Figs. 3 and 5) to which one end of the hose 4 is connected in well known manner.

Suitable packings are employed between the coupling 15 and the member 22 to prevent fuel leakage as the reel 17 rotates with respect to the support tube 11. Packings or gaskets are also provided elsewhere, as shown, to prevent fuel leakage.

The other end of the hose 4 has secured thereto a probe nozzle reception coupling 6 (see Figs. 1 and 2) which contains a valve and a latching device which may, for example, be of construction as illustrated in the aforesaid copending application of Camille S. Le Clair, Serial No. 399,119, filed December 18, 1953, or other equivalent valve and latching device. Then, beyond said reception coupling 6 is a funnel-shaped member 5 which has been appropriately called a "drogue."

For the time being, it suffices to state that, after initially paying out or unwinding the hose 4 by virtue of power rotation of the reel 17, the drogue 5 when in the air stream constitutes an anchor which renders the reel 17 self-energizing, whereby the power means for rotating the reel 17 may be shut off.

b. *The server arm*

In the present case, the brackets 12 and 13 carry a casing 27, in one end wall of which is journalled a drive gear and sprocket wheel 28 in mesh with gear 21; and trained thereover is a chain 29 which, in turn, drives the threaded parallel shafts 30. Said shafts 30 are journalled at their ends in the end walls of said casing and extend parallel to the reel axis as best shown in Fig. 5. A server arm 31 is threaded onto said shafts 30, and has an eye 32 through which the hose 4 extends tangential to the reel 17.

As the hose 4 is being unwound from the reel 17, the counterclockwise rotation thereof and of the gears 21 and 28 and shafts 30 (as viewed in Fig. 4) will cause the server arm 31 to progressively move axially of the reel (from the left toward the right as viewed in Fig. 5), and, conversely, when the hose 4 is being rewound onto the reel 17, the server arm 31 moves axially of the reel in the opposite direction, that is, from the right-hand end of the reel 17 toward the lefthand end. The gear and sprocket ratios and the thread pitch of shafts 30 are selected so that such axial movement of the server arm 31 corresponds to the pitch of the helical groove of reel 17, and in this way the hose 4 will always be pulled tangentially off the reel 17 and will always be properly guided when rewound.

Said eye 32 has a smooth bore therethrough which preferably is flared and smoothly rounded at its outer end to allow bending of the hose 4 as the server arm 31 moves back and forth relative to the reel and relative to the hose feed opening of the tanker airplane 1.

III. CONTROL UNITS AND CONTROL CIRCUITS (FIGS. 2-16)

A. *The power drive means for the reel*

Within the hose reel 17 and keyed on the support tube 11 is a plate 36 on which is mounted a gear box 37 and reversible electric drive motor 38, the drive pinion 39 of said gear box meshing with an internal ring gear 40 secured inside the reel 17, to thus drive the reel in either direction to unwind the hose 4 therefrom or to rewind the hose 4 thereonto.

B. *The hydraulic balancing unit and accumulators inside the reel*

Also secured to said plate 36 is a so-called "hydraulic balancing unit" 41 which, as is to be described later, operates in conjunction with pressure accumulators as a gear pump to impose resistance to free hose unwinding rotation of reel 17 and as a gear motor to assist the motor 38 in hose rewinding rotation of said reel. Said unit 41 has a gear 42 on one of its shafts which meshes with the internal ring gear 40.

Also mounted on the support tube 11 and inside the reel 17 are pressure accumulators 43 and 44, certain ones of which, viz. those identified by the reference numerals 43, (only one accumulator 43 being shown in Figs. 2 and 3) are low pressure accumulators supplied at one end with relatively low pressure air, 100 p.s.i. for example, from a pipe 45. Within each accumulator 43 is a floating piston 46 which subdivides the space therein into air and oil chambers 47 and 48, whereby the hydraulic oil pressure in manifold 49 will be the same as the air pressure in chamber 47.

The other accumulators 44 are each high pressure accumulators supplied from pipe 50 with air, for example at 1100 p.s.i., which acts in chamber 51 on one side of the floating piston 52 therein to maintain a corresponding pressure on the hydraulic oil in chamber 53 on the opposite side of said piston and in the manifold 54. The hydraulic balancing unit 41 has its ports connected to the accumulators 43 and 44 by way of pipes and valves as are shown in Fig. 10, the valves being mounted inside the reel on spindle 11 or spider 19.

C. *The control box and panel*

The control box and panel are preferably separate units, the latter being shown in Figs. 8, 9, and 10 and described later in connection with the electrical components of the system. In essence, the control box 61 is defined by a cover detachably secured to casing 27 and has secured therein, as best shown in Figs. 4, 6, 7, and 10, a cam mechanism comprising a cam shaft 62 having thereon (*a*) an arm 63 of a potentiometer 64, said arm 63 rotating with said shaft to vary the resistance of the potentiometer and thereby vary the reading on the footage indicator gauge 65 (see Figs. 8–10) on the control panel 66, (*b*) a recuperating cam 67 which operates a relief valve 68 for replenishing the oil to the high pressure accumulators 44 to make up for leakage, (*c*) a travel-limiting and fuel cut-off cam 69 which operates limiting valves 70, 70, and (*d*) a short circuit cam 71 which operates three microswitches 72, 73, and 74 for controlling automatic operation of the reel 17.

Said cam shaft 62 is driven by a worm wheel 75 which meshes with a worm 76 having a sprocket wheel 78 driven by chain 29. The overspeed governor 77 in said control box 61 may be driven as by a shaft 79 which has a sprocket 80 also driven by chain 29.

D. *The hydraulic, pneumatic, and electrical systems and components thereof*

These systems, as illustrated in Fig. 10, include several components, viz. the overspeed governor 77 (Fig. 11), the brake control valves 81 (Fig. 12), the metering valves 82 (Fig. 13), the limiting valves 70 (Fig. 14), the air-operated pilot valve 83 (Fig. 15), and the differential pressure switch 84 (Fig. 16) which will now be described in detail so that their respective functions in Fig. 10 may be readily comprehended. The remaining components are so well known in the art as not to require such special description.

As shown in Fig. 11, the overspeed governor 77 which is driven by the shaft 79 aforesaid comprises a housing 85 having a movable valve member 86 therein which is normally in passage-closing position to prevent escape of air from port 87, but which is moved to passage-opening position when the speed of the reel 17, and thus of the shaft 79 and centrifugal governor 88, exceeds a predetermined maximum. In such event, the governor-actuated valve 86 bleeds or vents the port 87. Such bleeding of port 87 effects closing of the brake control valves 81 to block oil flow through the balancing unit 41 with consequent braking of the reel rotation until such time that the governor speed permits valve 86 to move to passage-closing position under the influence of spring 89.

The brake control valves 81 in turn each comprise, as shown in Fig. 12, a housing 90 containing a movable valve member 91 therein which is normally in flow-blocking position except when air pressure in chamber 92 at desired magnitude acts on the piston 93 thereof to shift the same to open position. But, if the air pressure in chamber 92 is diminished, as by bleeding through the overspeed governor valve 77 as already mentioned, said brake control valves 81 will be actuated to brake-applying condition, that is, the valve members 91 therein will be shifted toward flow-blocking position by springs 94. Each brake control valve may have a relief valve 95 therein to release excess pressure.

The metering valve 82 (Fig. 13) comprises a casing 97 having a piston valve member 98 which is reciprocable therein and which is spring-held in position closing communication between the hydraulic ports thereof, but when air under pressure is admitted in chamber 99, the valve member 98 will be urged upward in proportion to the air pressure to open hydraulic communication in desired metered amount.

The limiting valve 70 (Fig. 14) has a spring-actuated spool valve member 100 therein which, when forced downwardly by the cam aforesaid, opens the valve for flow of fluid therethrough.

The air-operated pilot valve 83 (Fig. 15) has a spring-closed piston valve member 101 therein, and upon admission of air pressure into chamber 102, the valve member 101 is thereby shifted to the position shown to permit fluid flow through the valve.

The differential pressure switch 84 (Fig. 16) comprises a housing 103, and when there is a fuel pressure differential on opposite sides of the diaphragm 104 therein as occasioned by flow of fuel in the fuel supply line, the contacts of switch 105 are closed.

(a) THE HYDRAULIC CIRCUIT

As is best shown in Fig. 10, the hydraulic circuit comprises the accumulators 43 and 44, there being an oil discharge line 106 from the low pressure accumulator 43 through one metering valve 82 and one brake control valve 81 to a port of the hydraulic balancing unit 41. The high pressure accumulator 44, in turn, has an oil port in communication with line 107 for oil flow from the other port of unit 41 by way of the other metering valve 82 and the other brake control valve 81.

In between the accumulators 43 and 44 is a high pressure relief valve 108 through which oil may flow from the high pressure line to the low pressure line 106 whenever the pressure in the high pressure line 107 exceeds the relief pressure to which said relief valve 108 is set. The low pressure line 106 also communicates with the high pressure line 107 by way of the air-operated pilot valve 83 and relief valve 68.

The arrangement of the hydraulic system is such that, when the balancing unit 41 is driven in one direction by the reel during unwinding of the hose from the latter, oil under 100 p.s.i. (less the pressure drop through the metering valve 82, the brake control valve 81, and the line 106) is supplied to the inlet port and said balancing unit then operates as a pump to deliver oil through the brake control valve 81, the metering valve 82, and the high pressure line 107 to the high pressure accumulator 44.

Then, when the reel is driven by motor 38 in the reverse direction, the stored high pressure oil in the high pressure accumulator 44 drives the unit 41 as a hydraulic motor so as to assist in the rewinding of the hose 4 onto the reel 17, the oil being returned to the low pressure accumulator 43.

Because the hose reel 17 generally does not continue to rotate in the unwinding direction during the refueling operation, the stored liquid energy may have leaked from the high pressure accumulator 44 to the low pressure accumulator 43 through the balancing unit 41; and, in order to maintain a large supply of the oil in the high pressure accumulator 44 for rewind assistance at the conclusion of the refueling operation, there is provided the recuperating cam 67 on the cam shaft 62 which opens the relief valve 68 to allow oil to be displaced from accumulator 43 into the high pressure accumulator 44 as by a suitable pump P.

(b) THE PNEUMATIC SYSTEM

The pneumatic system comprises a main air supply line 113 which is connected, for example, to a 1500 p.s.i. compressed air source. In said air supply line is serially arranged a relief valve 114 which vents excess air pressure above that to which the relief valve is set, a normally closed solenoid-operated valve 115 which, when the solenoid thereof is energized, opens to initiate the operation of the pneumatic system, and an air pressure switch 116, the contacts of which are closed when the proper air pressure is present in the air line 117.

The air pressure line 117 is divided into several branches, one of which leads to the air pressure chamber 102 of the air-operated pilot valve 83, another of which leads to the air chambers 92 of the brake control valves 81, and another of which leads to the air chambers 99 of the metering valves 82. The overspeed governor 77 air port 87 is communicated with the brake control valve air chambers 92 by way of the lines 118 and 119. The lines 118 and 119 may also be bled through the limiting valves 70.

(c) THE ELECTRICAL SYSTEM

The reversible electric drive motor 38 previously described is schematically shown in Fig. 10 as including an unwinding field 126 and a rewinding field 127; and, therefore, the motor 38 will be driven in the desired direction according to which one of these two fields is energized.

Similarly, the main fuel control valve V in supply line 14 is preferably electric motor-operated, there being one field 128 which, when energized, opens the main fuel control valve, and another field 129 which, when energized, closes the main fuel control valve.

Operated by the short circuit cam 71 are the three microswitches 72, 73, and 74 which effect control of a yellow panel light 130, the drive motor 38, and the fuel control valve motor respectively, in a manner as will be fully described under the heading "Operation."

The potentiometer 64 previously described is electrically connected to the hose footage indicator gauge 65, and as the resistance through the potentiometer decreases, the footage indicating needle of the gauge swings to indicate the length of hose 4 which has been unwound from the reel 17.

The control panel 66 includes a panel light 131 and three other lights, i.e. the yellow light 130, a green light 132, and a blue light 133, the purposes of which will be hereinafter described.

In addition, the panel 66 and its associated box (see Figs. 8, 9, and 10) has a master switch 134, a main fuel supply valve control switch 135 having three positions, "Open," "Off," and "Automatic," and a trail and rewind control lever 136 which operates rewind and trail microswitches 137 and 138.

IV. OPERATION

Assuming that the tanker airplane 1 is in flight and that an airplane 2 to be refueled is approaching from the rear, the hose reel operator first swings the lever 136 in a clockwise direction (Fig. 10) or upward (Fig. 8) to close the microswitch 137 whereby current flows from the plus side of the 27 volt D.C. line through the closed contacts in said microswitch 137, through normally closed contacts of the microswitch 73, and thence through the unwind field coil 126 of the reversible auxiliary drive motor 38.

After predetermined rotation of the reel 17 and consequent rotation of the cam shaft 62, the microswitch 73 is opened by the short circuit cam 71; and, by this time, the drogue 5 is in the airstream of the tanker airplane 1, and therefore continued payout of the hose 4 occurs even though the motor 38 is now deenergized by opened microswitch 73.

The master switch 134, interlocked with the air supply, when operated to "On" position, establishes an electric circuit from the plus side of the power line, through the master switch 134 and the coil of the solenoid valve 115 to the negative side of the power line. Thus, air under pressure from the air supply source (say, 1500 p.s.i.) flows through the relief valve 114, solenoid valve 115, and pressure switch 116 to the brake control valves 81, the metering valves 82, and the air-operated pilot valve 83.

The presence of air pressure in the pressure switch 116 closes the electrical contacts thereof to establish an electrical circuit from the plus side of the power line through the contacts of said pressure switch 116, and through the blue lamp 133 to the negative side of the power line, whereby the lighting of said blue lamp indicates that the air pressure line 113 is in proper operating condition.

As the hose 4 is unwound from the reel 17, the rotation of the cam shaft 62 rotates the arm 63 of the potentiometer 64 to thus progressively reduce the resistance of the latter, whereby the needle of gauge 65 moves progressively clockwise to indicate the trailing length of hose 4. This electric current flow is from the plus side of the power line, through potentiometer 64, through a coil in meter 65, and through resistor 146 to the negative side of the power line.

Also in the meter circuit is the panel light 131 having a switch 147 in series therewith.

The yellow signal lamp 130 on the instrument panel 66 lights as soon as the microswitch 72 is closed by the short circuit cam 71 (plus side of power line through the resistor 148 (dim light) or through short circuit arm 149 (bright light), through the yellow lamp 130, and through the closed contacts of said microswitch 72 to the negative power line).

As the hose 4 is being thus unwound from the reel under the influence of the anchor or drogue 5, the gears of the balancing unit 41 are rotated in a direction such that oil in the low pressure accumulator 43 flows through line 106 and through the metering valve 82 and the brake control valve 81 and is discharged under high pressure through the other brake control valve 81 and metering valve 82 into the high pressure accumulator 44. This pumping of oil by unit 41 in opposition to the 1100 p.s.i. air pressure in accumulator 44 creates sufficient resistance to unwinding rotation of reel 17 so that a desired drag or tension is maintained on the hose 4 as it is being let out.

Because the desired air pressure is present in the brake control valves 81 and metering valves 82, the air drag of said drogue 5 will exceed the resistance offered by said balancing unit 41. However, should the reel speed be so great that the speed of the governor drive shaft 79 speed exceeds, say, 800 r.p.m. for example, then the overspeed governor 77 becomes operative, as before described, to bleed air pressure from the brake control and metering valves 81 and 82 to effect a closing or partial closing thereof and thereby effect a braking of the reel rotation by blocking the oil inlet into and oil discharge from unit 41.

Now, when the receiving plane nose has entered the drogue 5, and when the receptor coupling 6 and the airplane probe nozzle assembly are open and latched together, the operator may switch the main fuel supply valve switch 135 from "Off" to "Open" position, an electric circuit being established from the plus side of the power line through said switch 135, and through the field 128 of the fuel control valve motor to ground or the negative side of the power line. Thus, the main fuel supply valve will be opened so that fuel will flow through the fuel supply line 14, the support tube 11, and the hose 4 into the fuel tank filling line of the receptor plane 2.

The fuel supply line 14 has an orifice plate 150, and as soon as there is a flow of fuel in the supply line, the resulting pressure differential on opposite sides of said orifice plate is effective to close the electrical contacts of the switch 105 in differential pressure switch 84 to light the green lamp 132 (dim or bright, depending on whether the current flows through the resistor 151 or bypasses by way of the short circuit arm 152).

As the refueling-in-flight operation progresses, the hose 4 may reel in or out maintaining predetermined tension thereon and taking up slack thereof. When the drag on the hose 4 drops below the prescribed value, as when the speed of the receiver airplane 2 is greater than that of the tanker airplane 1, the hose 4 is automatically wound in by the motor effect of the balancing unit 41, that is, high pressure oil in the high pressure accumulator circuit 44, 107, 82, and 81 acting on the balancing unit 41.

Similarly, as the receiver plane 2 drops back as, for example, when the refueling operation has been completed, the hose drag tends to increase above the prescribed value, whereupon the hose 4 is unreeled, the balancing unit 41 then acting as a pump to displace oil from the low pressure accumulator circuit 43, 106, 82, and 81 into the high pressure circuit. Finally, if the drop back continues to the point where all but the last ten feet of the hose 4 has been unwound from the reel, the probe-drogue connection coupling will be disconnected, and microswitch 74 will be operated to immediately shut off the main fuel supply valve through operation of the motor field 129.

In one example, the hose tension is maintained at about 500 lbs. and the "pneumatic spring" effect of the high pressure accumulator 44 will compensate for inward or outward hose accelerations in excess of 27 ft./sec.$^2$.

At the time that the refueling operation is complete, the main fuel supply valve switch 135 will be shifted to "Off" position, establishing an electric circuit through the field 129 of the fuel supply valve motor. With the fuel flow thus stopped, the contacts of the differential pressure switch 84 will open to extinguish the green lamp 132.

After the drogue-probe connection has been severed, the control lever 136 is moved from neutral position to close the rewind microswitch 138, whereby current flows through the rewind field 127 of motor 38. In this way, the electric motor 38 rewinds the hose 4 on the reel 17, and such rewinding is assisted by the operation of the balancing unit 41 as a hydraulic motor, under the influence of the reservoir of high pressure oil in the high pressure accumulator 44.

When the main fuel supply valve switch 135 is in the "Automatic" position, the operation of the fuel supply valve motor is under the control of the microswitch 74 operated by the short circuit cam. Thus, refueling progresses until the receiver plane 2 drops back so that only ten feet of hose remains on the reel, and thus breakaway is imminent, and at this point the notch in the short circuit cam 71 has moved to a position opposite the switch arm of said microswitch 74, whereupon the fuel supply valve motor is reversed to close the main fuel supply valve.

With reference to the travel-limiting valves 70, these operate to release the air pressure in the chambers of the brake control valves 81, whereby the unwinding rotation of the reel 17 is braked at the proper times to build up a tension in the hose when the receiver plane drops back to the point where only ten feet of hose remains on the reel and at which time breakaway is imminent.

Other modes of applying the principle of the invention may be employed, change being made as regards the details described, provided the features stated in any of the following claims, or the equivalent of such, be employed.

I therefore particularly point out and distinctly claim as my invention:

1. In an aircraft refueling-in-flight system, the combination of a fuel supply airplane carrying a length of fuel supply hose equipped with a drogue and a coupling at one end, reversible power means operative to pay out the end portion of said hose into the airstream of said airplane, means responsive to predetermined paying out of said hose operative to deenergize said power means for additional paying out of said hose under the influence of frictional drag of said drogue and for connection of said coupling to a receiver airplane to be refueled, and energy storage means of the type imposing a substantially constant opposition to trailing of said hose operated responsive to paying out of said hose as aforesaid to store energy therein and operative to assist in pulling in of said hose.

2. In an aircraft refueling-in-flight system, the combination of a fuel supply airplane carrying a drogue and coupling equipped length of hose through which fuel is adapted to be supplied from said fuel supply airplane to a receiver airplane adapted to be coupled to said hose through the coupling thereof, reversible power means operative to introduce the drogue and coupling portion of said hose into the airstream of said fuel supply airplane, means responsive to a predetermined paying out of said hose operative to deenergize said power means whereafter the frictional drag of said drogue continues to pull out additional hose from said fuel supply airplane, and energy storage means of the type imposing a substantially constant opposition to trailing of said hose operated by such pulling out of said hose and operative to assist in the pulling in of said hose during travel of said airplanes at different speeds and at varying relative altitudes and thus to take up slack in said hose during the refueling operation.

3. In an aircraft refueling-in-flight system, the combination of a fuel supply airplane provided with a fuel supply tank, a rotary hose reel mounted in said airplane and having a fuel outlet port, a fuel supply line leading from said tank to said port, a length of hose coiled around said reel and having one end thereof connected to said port, reversible power means operative to rotate said reel in a direction to unwind said hose therefrom, means to deenergize said power means when the other end of said hose is in the air stream of said airplane, a drogue and a coupling at said other end of said hose effective, when positioned in the airstream of said airplane and when said power means is deenergized, to unwind said hose from said reel for trailing downwardly and rearwardly of said airplane and for connection of said coupling to a fuel inlet port of a receiver airplane to be refueled, and energy storage means of the type imposing a substantially constant opposition to trailing of said hose operated responsive to such unwinding of said hose from said reel to store energy therein operative to assist in hose rewinding rotation of said reel.

4. In an aircraft refueling-in-flight system, the combination of a fuel supply airplane provided with a fuel supply tank, a rotary hose reel mounted in said airplane and having a fuel outlet port, a fuel supply line leading from said tank to said port, a length of hose coiled around said reel and having one end thereof connected to said port, a drogue and a coupling at the other end of said hose effective, when positioned in the airstream of said airplane, to unwind said hose from said reel for trailing downwardly and rearwardly of said airplane and for connection of said coupling to a fuel inlet port of a receiver airplane to be refueled, energy storage means of the type imposing a substantially constant opposition to trailing of said hose operated responsive to such unwinding of said hose from said reel to store energy therein operative to assist in hose rewinding rotation of said reel, reel drive means for rotating said reel in hose unwinding direction to unwind a length of hose sufficient to position said drogue in the airstream of said fuel supply airplane, and means to deenergize said reel drive means responsive to predetermined unwinding of said hose.

5. In a hose reel assembly and control mechanism therefor, the combination of a support, a reel journalled on said support and having a fluid supply port, a length of hose coiled around said reel and connected at one end to said port, said reel rotating in opposite directions during unwinding and rewinding of said hose therefrom and thereonto respectively, a substantially constant fluid pressure system mounted on said support and operatively connected to said reel to assist in rotation of said reel in the hose rewinding direction, fluid pressure generating means in said system operated by rotation of said reel in hose unwinding direction, and an overspeed governor and a valve controlled by said governor, said governor being driven by said reel and being effective when the hose unwinding speed exceeds a predetermined speed to operate said valve to a position reducing the effective size of a fluid passage in said valve, said valve being installed in said system and being effective when thus operated to impede displacement of fluid by said fluid pressure generating means and thereby impose added resistance to continued unwinding of said hose at a speed greater than such predetermined speed.

6. In a hose reel assembly and control mechanism therefor, the combination of a support, a reel journalled on said support and having a fluid supply port, a length of hose coiled around said reel and connected at one end to said port, said reel rotating in opposite directions during unwinding and rewinding of said hose therefrom and thereonto respectively, a constant pressure fluid storage system mounted on said support and operatively connected to said reel to assist in rotation of said reel in the hose rewinding direction, fluid pressure generating means in said system operated by rotation of said reel in hose unwinding direction to displace fluid in said storage system for use as aforesaid, a valve in said system having a passage through which fluid flows during operation of said fluid pressure generating means, a valve member movable in said valve to reduce the effective size of such valve passage to thus impede flow of fluid as aforesaid and means for so moving said valve member when a predetermined length of hose has been unwound from said reel.

7. In a hose reel assembly and control mechanism therefor, the combination of a support, a reel journalled on said support and having a fluid supply port, a length of hose coiled around said reel and connected at one end to said port, a drogue on the other end of said hose adapted to be positioned in the airstream of a fuel supply airplane to thereafter unwind said hose from said reel by the frictional drag of said drogue, reversible power means mounted on said support operative to drive said reel in opposite directions, means on said support operative automatically to deenergize said power means responsive to the unwinding of a predetermined length of hose, and energy storage means mounted on said support and operated by continued unwinding rotation of said reel to retain energy therein and operative to assist said power means in rewinding said hose onto said reel.

8. In a hose reel assembly and control mechanism therefor, the combination of a support, a reel journalled on said support and having a fluid supply port, a length of hose coiled around said reel and connected at one end to said port, a drogue on the other end of said hose adapted to be positioned in the airstream of a fuel supply airplane to thereafter unwind said hose from said reel by the frictional drag of said drogue, reversible power means mounted on said support operative to drive said reel in opposite directions, means on said support operative automatically to deenergize said power means responsive to the unwinding of a predetermined length of hose, and energy storage means mounted on said support and operated by continued unwinding rotation of said reel to retain energy therein and operative to assist said power means in rewinding said hose onto said reel, said energy storage means comprising a fluid pressure system having a pressure accumulator and a fluid motor-pump unit therein, the motor-pump unit of which is driven by said reel as a pump to store fluid energy in said accumulator as the reel rotates in hose unwinding direction.

9. In a hose reel assembly and control mechanism therefor, the combination of a support, a reel journalled on said support and having a fluid supply port, a length of hose coiled around said reel and connected at one end to said port, a drogue on the other end of said hose adapted to be positioned in the airstream of a fuel supply airplane to thereafter unwind said hose from said reel by the frictional drag of said drogue, reversible power means mounted on said support operative to drive said reel in opposite directions, means on said support operative automatically to deenergize said power means responsive to the unwinding of a predetermined length of hose, and energy storage means mounted on said support and operated by continued unwinding rotation of said reel to retain energy therein and operative to assist said power means in rewinding said hose onto said reel, said energy storage means comprising a fluid pressure system having a pressure accumulator and a fluid motor-pump unit therein, the motor-pump unit of which is driven by said reel as a pump to store fluid in said accumulator as the reel rotates in hose unwinding direction, said unit constituting a fluid motor operated by the stored fluid energy when unwinding pull on said hose is released, whereby to assist said power means in rewinding of said hose onto said reel.

10. In a hose reel assembly and control mechanism therefor, the combination of a support, a reel journalled on said support and having a fluid supply port, a length of hose coiled around said reel and connected at one end to said port, a drogue on the other end of said hose adapted to be positioned in the airstream of a fuel supply airplane to thereafter unwind said hose from said reel by the frictional drag of said drogue, reversible power means mounted on said support operative to drive said reel in opposite directions, means on said support operative automatically to deenergize said power means responsive to the unwinding of a predetermined length of hose, and energy storage means mounted on said support and operated by continued unwinding rotation of said reel to retain energy therein and operative to assist said power means in rewinding said hose onto said reel, an overspeed governor mounted on said support and driven by said reel, and brake means also mounted on said support and operated by said governor to apply braking force on said reel whenever the reel speed exceeds a predetermined value.

11. In a hose reel assembly and control mechanism therefor, the combination of a support, a reel journalled on said support and having a fluid supply port, a length of hose coiled around said reel and connected at one end to said port, a drogue on the other end of said hose adapted to be positioned in the airstream of a fuel supply airplane to thereafter unwind said hose from said reel by the frictional drag of said drogue, reversible power means mounted on said support operative to drive said reel in opposite directions, means on said support operative automatically to deenergize said power means responsive to the unwinding of a predetermined length of hose, and energy storage means mounted on said support and operated by continued unwinding rotation of said reel to retain energy therein and operative to assist said power means in rewinding said hose onto said reel, a fluid supply line connected to said port, a shut-off valve in said line, and means mounted on said support and operated by predetermined rotation of said reel for automatically operating said valve to shut off fluid flow through said hose upon continued unwinding of said hose beyond a predetermined rotation of said reel.

12. In a hose reel assembly and control mechanism therefor, the combination of a support, a reel journalled on said support and having a fluid supply port, a length of hose coiled around said reel and connected at one end to said port, a drogue on the other end of said hose adapted to be positioned in the airstream of a fuel supply airplane to thereafter unwind said hose from said reel by the frictional drag of said drogue, reversible power means mounted on said support operative to drive said reel in opposite directions, means on said support operative automatically to deenergize said power means responsive to the unwinding of a predetermined length of hose, and energy storage means mounted on said support and operated by continued unwinding rotation of said reel to retain energy therein and operative to assist said power means in rewinding said hose onto said reel, said energy storing means comprising a liquid pressure system including a first accumulator and a second accumulator, and a motor-pump unit in said system operated by rotation of said reel to displace liquid under pressure from said first accumulator into said second accumulator for storage in the latter, said unit operating as a motor to drive said reel in hose rewinding direction under the influence of the stored liquid pressure upon release of hose unwinding force on said reel.

13. In a hose reel assembly and control mechanism therefor, the combination of a support, a reel journalled on said support and having a fluid supply port, a length of hose coiled around said reel and connected at one end to said port, a drogue on the other end of said hose adapted to be positioned in the airstream of a fuel supply airplane to thereafter unwind said hose from said reel by the frictional drag of said drogue, reversible power means mounted on said support operative to drive said reel in opposite directions, means on said support operative automatically to deenergize said power means responsive to the unwinding of a predetermined length of hose, and energy storage means mounted on said support and operated by continued unwinding rotation of said reel to retain energy therein and operative to assist said power means in rewinding said hose onto said reel, said energy storing means comprising a liquid pressure system including a first accumulator and a second accumulator, a motor-pump unit in said system operated by said reel to displace liquid under pressure from said first accumulator into said second accumulator for storage in the latter, said unit operating as a motor to drive said reel in hose rewinding direction under the influence of the stored liquid pressure upon release of hose unwinding force on said reel, air pressure-operated valves in said system provided with passages through which liquid flows between said accumulators, an air pressure supply line connected to said valves, said valves having air pressure actuated valve members therein for impeding liquid flow therethrough responsive to reduction of air pressure acting on said valve members, and air pressure release devices in said supply line operated by said reel upon predetermined length of hose being unwound from said reel whereby said valves impede liquid flow between said accumulators and thus impose added resistance to continued hose unwinding rotation of said reel.

14. In a hose reel assembly and control mechanism therefor, the combination of a support, a reel journalled on said support and having a fluid supply port, a length of hose coiled around said reel and connected at one end to said port, a drogue on the other end of said hose adapted to be positioned in the airstream of a fuel supply airplane to thereafter unwind said hose from said reel by the frictional drag of said drogue, reversible power means mounted on said support operative to drive said reel in opposite directions, means on said support operative automatically to deenergize said power means responsive to the unwinding of a predetermined length of hose, and energy storage means mounted on said support and operated by continued unwinding rotation of said reel to retain energy therein and operative to assist said power means in rewinding said hose onto said reel, said energy storing means comprising a liquid pressure system including a first accumulator and a second accumulator, a motor-pump unit in said system operated by said reel to displace liquid under pressure from said first accumulator into said second accumulator for storage in the latter, said unit operating as a motor to drive said reel in hose rewinding direction under the influence of the stored liquid pressure upon release of hose unwinding force on said reel, air pressure-operated valves in said system provided with passages through which liquid flows between said accumulators, an air pressure supply line connected to said valves, said valves having air pressure actuated valve members therein for impeding liqiud flow therethrough responsive to reduction of air pressure acting on said valve members, and an air pressure release governor in said supply line operated by said reel whenever the reel speed exceeds a predetermined value whereby said valves impede liquid flow between said accumulators and thus impose added resistance to continued hose unwinding rotation of said reel.

References Cited in the file of this patent

UNITED STATES PATENTS

| | | |
|---|---|---|
| 1,806,833 | Ullendorff | May 26, 1931 |
| 1,942,534 | Burghardt | Jan. 9, 1934 |
| 2,279,156 | Barks et al. | Apr. 7, 1942 |
| 2,496,890 | Peterson | Feb. 7, 1950 |
| 2,596,455 | Williams et al. | May 13, 1952 |
| 2,612,326 | Schweisthal | Sept. 30, 1952 |
| 2,634,926 | Worlidge | Apr. 14, 1953 |
| 2,692,102 | Cobham et al. | Oct. 19, 1954 |

FOREIGN PATENTS

| | | |
|---|---|---|
| 714,923 | Great Britain | Sept. 8, 1954 |